Figure 1:
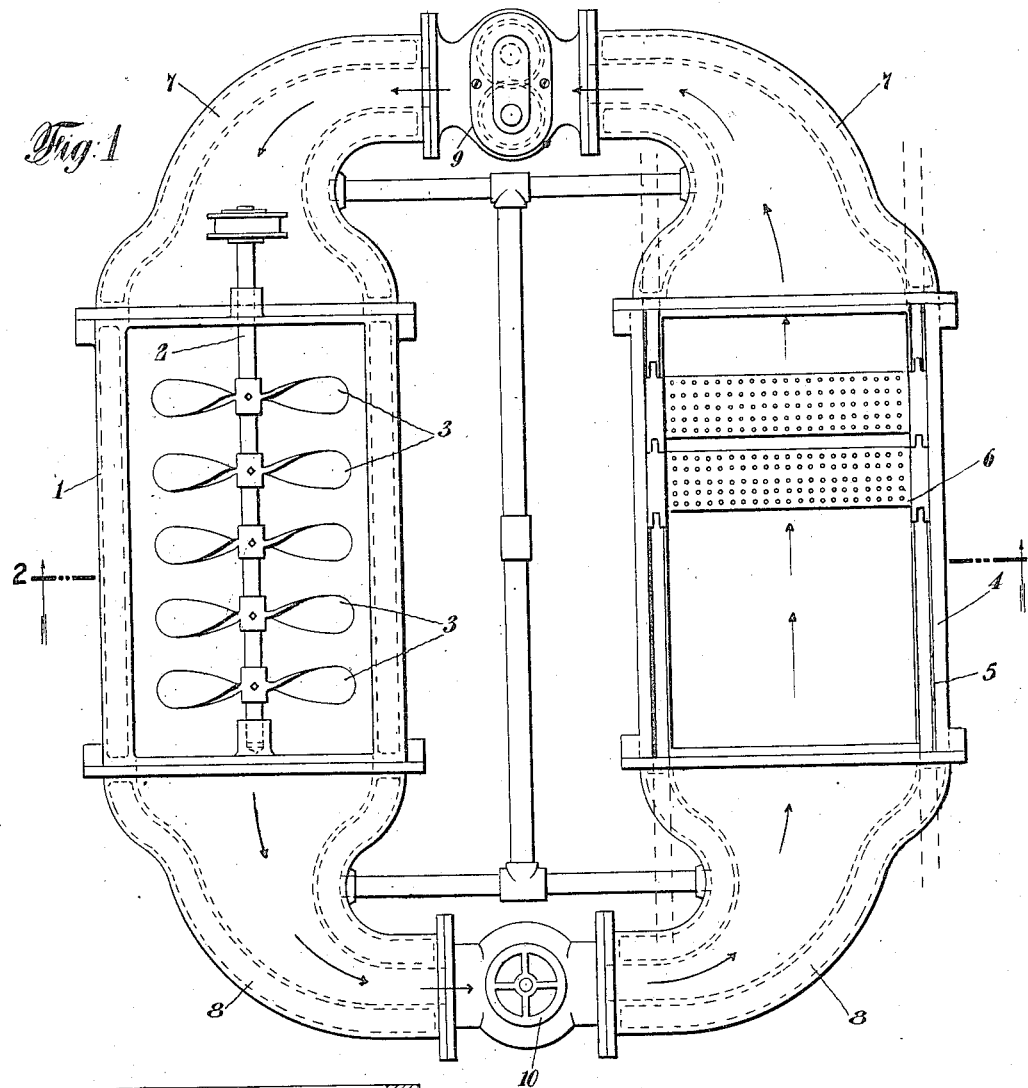

W. A. FAIRBURN.
PROCESS OF TREATING MATCH SPLINTS.
APPLICATION FILED NOV. 12, 1912.

1,070,025.

Patented Aug. 12, 1913.

Witnesses:
M. B. Goewey
L. Griffin

Inventor
William A. Fairburn
By his Attorney
John A. Nolan

UNITED STATES PATENT OFFICE.

WILLIAM A. FAIRBURN, OF SHORT HILLS, NEW JERSEY, ASSIGNOR TO THE DIAMOND MATCH COMPANY, OF CHICAGO, ILLINOIS, A CORPORATION OF ILLINOIS.

PROCESS OF TREATING MATCH-SPLINTS.

1,070,025.

Specification of Letters Patent.  Patented Aug. 12, 1913.

Application filed November 12, 1912. Serial No. 730,862.

*To all whom it may concern:*

Be it known that I, WILLIAM A. FAIRBURN, a citizen of the United States, and resident of Short Hills, in the county of Essex and State of New Jersey, have invented certain new and useful Improvements in Processes of Treating Match-Splints, of which the following is a specification.

This invention relates to an improvement in the process of treating match splints set out in Letters Patent of the United States No. 1,044,154, dated November 12, 1912, which process as therein described consists in subjecting the splints to a bath comprising an unctuous inflammable substance in which is maintained in suspension a finely-divided material that is adapted to impregnate the splints and render them non-glowing when the splints, as finished matches, are ignited and the flame extinguished. By way of illustration the specific inflammable substance mentioned is melted paraffin (paraffin wax) and the specific "impregnating" material is boracic acid.

The present invention has for its object to provide a simple and efficient process whereby the inflammable and non-glowing properties shall be imparted to the match splints. To that end I prepare a liquid bath of unctuous inflammable substance carrying an inorganic material reduced preferably to such a degree of fineness that it will tend to be and remain in suspension in the unctuous substance. This material is of a character to impart the requisite non-glowing properties to match splints impregnated therewith. The mass is agitated in order thoroughly to commingle the ingredients thereof, and in that condition it is caused to flow in a uniform stream, without surface agitation, through the dipping path. The splints are dipped to a sufficient depth and for a sufficient period of time into the flowing mass until the requisite impregnation of the splints with the components of the mixture has been effected.

I prefer to employ paraffin wax as the inflammable material and boracic acid as the material by which the non-glowing property is imparted to the splints, although, of course, in pursuance of my invention other materials of a character to impart the inflammable and non-glowing properties to the splints, may be employed.

An efficient mode of procedure is as follows: The paraffin wax in a melted state is introduced into a suitable tank and the finely-divided boracic acid is added to the liquefied substance in the proportion, by weight, of paraffin one hundred parts and boracic acid seven parts. These ingredients and proportion are given merely by way of example, as they admit of wide variation without departure from my invention. The tank is provided with suitable stirring devices whereby the materials may be well agitated and the acid thus be thoroughly commingled with the paraffin. From this tank the fluid mixture, either by means of a pump or gravitation, is delivered to and caused to flow, in the presence of heat, in a uniform stream through a dipping trough in a manner to insure a continuous circulation of the mixture through the tank and trough.

When my invention is used in connection with the manufacture of matches upon a continuous match making machine of the type wherein the splints are inserted row by row in an endless carrier and thereby held in spaced relation to each other and transported through the match making path, the dipping trough is suitably located beneath the route of the carrier, so that the depending splints on the latter during their travel toward the head-composition applying devices can be dipped into and subjected to the action of the flowing mass until the efficient impregnation of the splints with the respective components of the stream shall have been attained.

Figure 2:
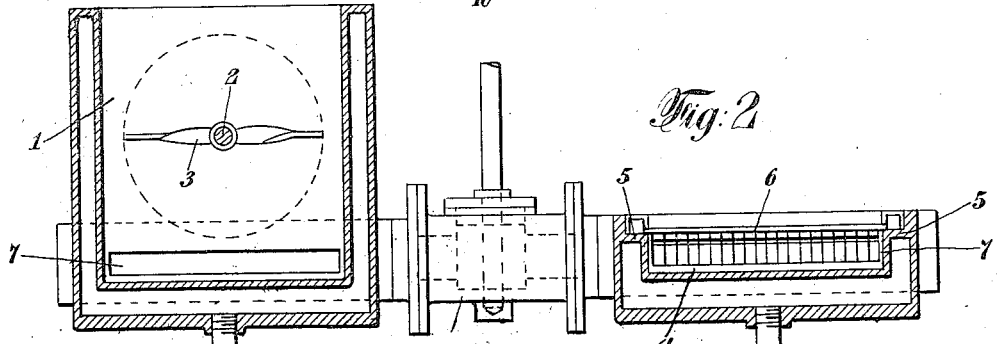

The annexed drawing illustrates an apparatus of simple and efficient construction and operation for practically carrying out my invention, Figure 1 being a plan view of the apparatus, showing a portion of the endless splint carrier, and Fig. 2 a transverse vertical section, as on the line 2—2 of Fig. 1.

1 designates a steam-jacketed mixing tank within which is mounted to rotate a shaft 2 equipped with mixing and propelling blades 3. This shaft is driven from a suitable source of power.

4 designates a steam-jacketed dipping trough provided along its sides with guides 5 for the endless splint carrier 6 of the match machine, whereby during the progress of the carrier the rows of splints therein extend down into the trough. The trough is in communication at its respective ends with the adjacent ends of the mixing tank, by means of steam-jacketed conduits 7, 8 respectively. The conduit 7 is provided with a geared pump 9, by means of which circulation of the fluid mixture through the tank and trough is maintained, and the conduit 8 is provided with a suitable regulating valve 10.

It is to be understood that the form of apparatus just described is herein given by way of example only.

I claim:—

1. The process of treating match splints to impart inflammable and non-glowing properties thereto, which consists in dipping the splints into a stream of unctuous inflammable liquid carrying an anti-glowing material.

2. The process of treating match splints to impart inflammable and non-glowing properties thereto, which consists in dipping the splints into a stream of an inflammable liquid carrying a finely-divided and anti-glowing material.

3. The process of treating match splints to impart inflammable and non-glowing properties thereto, which consists in dipping the splints into a stream of an unctuous inflammable substance carrying a finely-divided anti-glowing material.

4. The process of treating match splints to impart inflammable and non-glowing properties thereto, which consists in mixing with an unctuous inflammable substance a finely-divided material which will render the splints non-glowing when they have been ignited and the flame extinguished, causing a continuous flow of said mixture through a dipping bath, and dipping the splints into the flowing mixture.

5. The process of treating match splints to impart inflammable and non-glowing properties thereto, which consists in providing a mixture of melted paraffin wax and an anti-glowing material, causing the mixture to flow in a stream, and dipping the splints into the flowing mixture.

6. The process of treating match splints to impart inflammable and non-glowing properties thereto, which consists in melting paraffin wax, adding thereto a finely-divided anti-glowing material, agitating the mixture, causing it to flow in a stream in the presence of heat, and dipping the splints into the flowing mixture.

Signed at New York, in the county and State of New York, this 11th day of November A. D. 1912.

WILLIAM A. FAIRBURN.

Witnesses:
B. CHANDLER SNEAD,
FRANCIS R. GRIFFIN.

Copies of this patent may be obtained for five cents each, by addressing the "Commissioner of Patents, Washington, D. C."